United States Patent
Tamura et al.

(10) Patent No.: US 7,039,099 B2
(45) Date of Patent: May 2, 2006

(54) DEMODULATION APPARATUS AND DEMODULATION METHOD FOR MOBILE COMMUNICATION

(75) Inventors: Koichi Tamura, Tokyo (JP); Akihisa Ushirokawa, Tokyo (JP)

(73) Assignee: NEC Corporation, Tokyo (JP)

(*) Notice: Subject to any disclaimer, the term of this patent is extended or adjusted under 35 U.S.C. 154(b) by 683 days.

(21) Appl. No.: 09/829,048

(22) Filed: Apr. 10, 2001

(65) Prior Publication Data

US 2001/0033609 A1    Oct. 25, 2001

(30) Foreign Application Priority Data

Apr. 19, 2000   (JP)   .............................. 2000-117370

(51) Int. Cl.
  *H04B 1/707* (2006.01)
(52) U.S. Cl. ...................................... 375/150; 375/148
(58) Field of Classification Search ................ 375/142, 375/143, 144, 147, 150, 152, 148
See application file for complete search history.

(56) References Cited

U.S. PATENT DOCUMENTS

| 5,530,716 | A | 6/1996 | Lipa |
| 6,222,834 | B1 | 4/2001 | Kondo |
| 6,389,067 | B1 * | 5/2002 | Riddle et al. ............... 375/225 |
| 6,639,551 | B1 * | 10/2003 | Li et al. ..................... 342/381 |
| 6,678,309 | B1 * | 1/2004 | Kitahara .................... 375/144 |
| 6,683,924 | B1 * | 1/2004 | Ottosson et al. ........... 375/343 |
| 6,912,227 | B1 * | 6/2005 | Chang et al. ............... 370/441 |

FOREIGN PATENT DOCUMENTS

CN    1206967    2/1999

OTHER PUBLICATIONS

S.S. Rappaport et al., "Spread-Spectrum Signal Acquisition: Methods and Technology." IEEE Communications Magazine, vol. 22:6, Jun. 1984, pp. 6-21.

* cited by examiner

Primary Examiner—Young T. Tse
Assistant Examiner—Sam K. Ahn
(74) Attorney, Agent, or Firm—Foley & Lardner LLP

(57) ABSTRACT

A path timing comparing section compares correlation peak values and their path timings detected from a delay profile with correlation peak values and their path timings assigned to fingers in the previous cycle. If a path timing determining section determines from the comparison result that a path with high intensity level has appeared, it immediately assigns the path to a finger. This enables maintaining good receiving characteristics.

29 Claims, 13 Drawing Sheets

DELAY PROFILE

DELAY PROFILE OF THE PREVIOUS CYCLE

DELAY PROFILE

DEMODULATION APPARATUS AND DEMODULATION METHOD FOR MOBILE COMMUNICATION

BACKGROUND OF THE INVENTION

1. Field of the Invention

The present invention relates to a demodulation apparatus and a demodulation method for mobile communication. In particular, it relates to a demodulation apparatus and a demodulation method for mobile communication adopting CDMA (Code Division Multiple Access).

2. Description of the Related Art

Conventionally, in a demodulation circuit as mentioned above a path diversity effect is obtained by path search and RAKE combining. Examples in the prior art of this kind are disclosed in Japanese Patent Laid-Open No. 10-94041 (hereafter referred to as document 1), Japanese Patent Laid-Open No. 10-200506 (hereafter referred to as document 2), Japanese Patent Laid-Open No. 11-251962 (hereafter referred to as document 3), and Japanese Patent Laid-Open No. 11-261528 (hereafter referred to as document 4).

The technique disclosed in document 1 involves using at least one of the receiving fingers for search. The technique disclosed in document 2 involves saving the maximum value among previous correlation values and using the maximum value in selecting high values out of correlation values. The technique disclosed in document 3 involves detecting reception levels from reception signals, to compare them with a predetermined threshold, and to determine whether or not a correlation signal of an internal memory should be outputted to a reception path timing generation section depending on the comparison result. The technique disclosed in the document 4 involves reading a sequence of measurements, deriving a timing offset having a resolution higher than a predetermined timing resolution of a searcher unit, and assigning a finger processing element to the best candidate path using the timing offset.

In a mobile communication environment, radio waves to be received are suffered from changes including appearance and disappearance caused by shadowing. Paths that have not been path-searched in intense path changes become interfering components for a receiver and degrade the reception characteristics. Thus, path search with high accuracy and high speed is desired. However, none of the above mentioned documents from 1 to 4 describe measures for solving this problem.

SUMMARY OF THE INVENTION

Accordingly, it is an object of the present invention to provide a demodulation apparatus for mobile communication which can receive a path immediately after the path appears and provide good receiving characteristics; a demodulation method for the demodulation apparatus; and a recording medium on which a control program for the demodulation method is recorded.

For solving the above mentioned problem, a first aspect of the present invention is the demodulation apparatus for the mobile communication having capability of cyclically selecting signals that meet a predetermined condition out of signals incoming via different paths, combining the signals, and outputting the combined signals, wherein the apparatus comprises threshold setting means, and signal selecting means for comparing an incoming signal with a threshold set by the threshold setting means and for selecting the compared signal according to the comparison result even if the signal does not meet the predetermined condition.

Further, a second aspect of the present invention is the demodulation method for mobile communication providing capability of cyclically selecting signals that meet a predetermined condition out of signals incoming via different paths, combining the signals, and outputting the combined signals, wherein the method comprises a first step of setting a threshold, and a second step of comparing an incoming signal with the threshold set by the first step and selecting the compared signals according to the comparison result even if the signal does not meet the predetermined condition.

Further, a third aspect of the present invention is the recording medium on which a control program for a demodulation method for mobile communication is recorded, the demodulation method providing capability of cyclically selecting signals that meet a predetermined condition out of signals incoming via different paths, combining the signals, and outputting the combined signals, wherein the control program is recorded on the recording medium and comprises a first step of setting a threshold, and a second step of comparing an incoming signal with the threshold set by the first step and selecting the compared signals according to the comparison result even if the signal does not meet the predetermined condition.

The first, second, and third aspects allow for reception of a path immediately after the path appears and providing good receiving characteristics, since these aspect are configured to compare the incoming signals with the threshold set by the threshold setting means and to select the compared signals according to the comparison result even if the signals do not meet the predetermined condition.

DESCRIPTION OF THE PREFERRED EMBODIMENTS

First, the features of the present invention will be described. A demodulation circuit for CDMA mobile communication according to the present invention receives a path immediately after the path appears to provide good receiving characteristics by path search processing that involves adaptively controlling a guard level for finger assignment according to a correlation peak value obtained by calculation of a delay profile.

Figure 1:
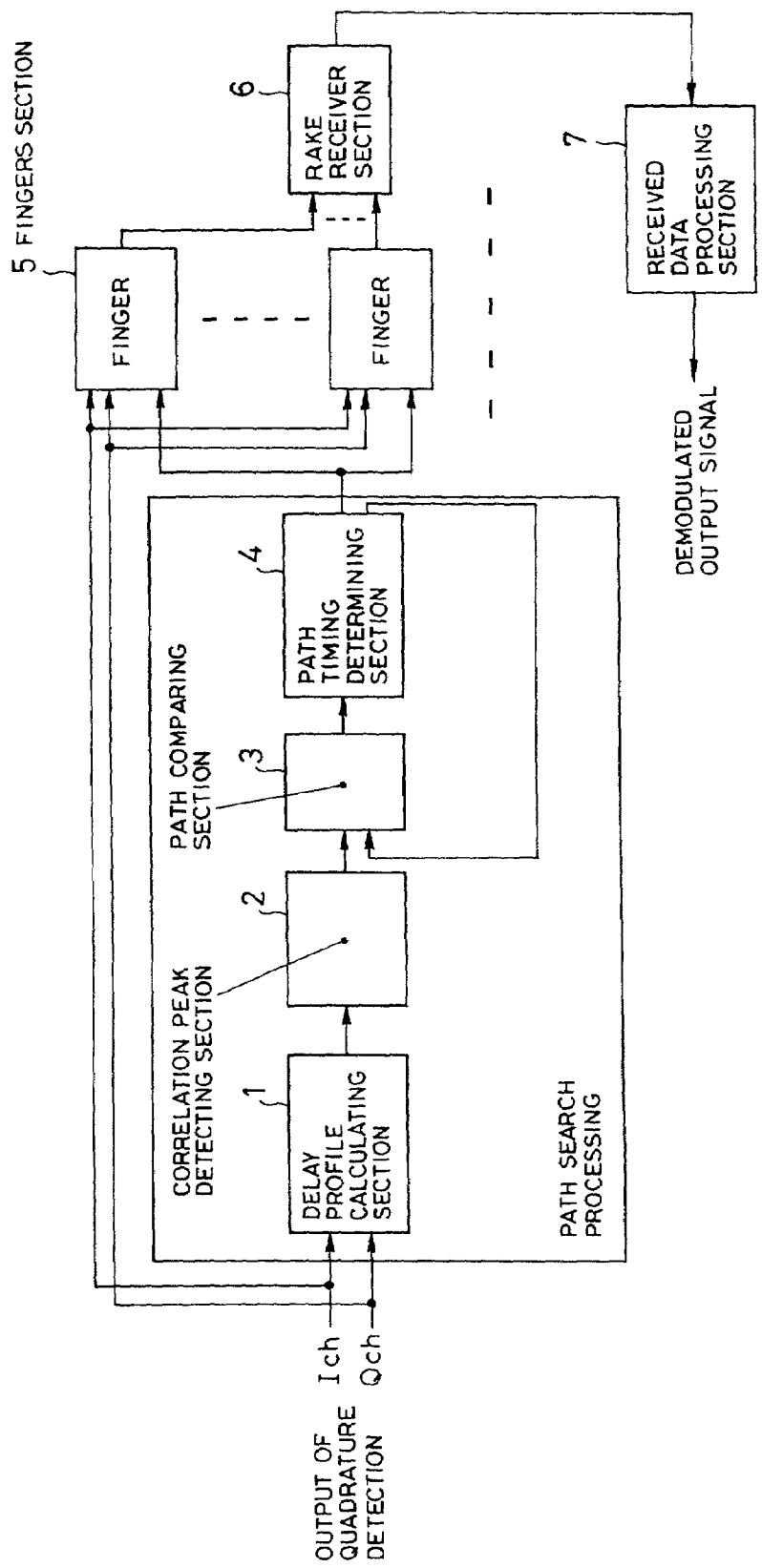
FIG. 1 is a block diagram of a first embodiment.

FIG. 1 shows a configuration of the demodulation circuit to which outputs of quadrature detection are input. A path comparing section 3 compares correlation peak values and their path timings detected from a delay profile with correlation peak values and their path timings assigned to fingers in the previous cycle. If a path timing determining section 4 determines from the comparison result that a path with high intensity level has newly appeared, it immediately assigns the path to one of the fingers 5. This allows for maintaining good receiving characteristics.

Now, embodiments of the present invention will be described with reference to the accompanying drawings. At first, a first embodiment will be described. FIG. 1 is a block diagram of the first embodiment of the present invention. It shows a configuration of the demodulation circuit, which is adapted for a common demodulation scheme in which fingers /a RAKE are used.

Referring to FIG. 1, the demodulation circuit comprises a delay profile calculating section 1, a correlation peak detecting section 2, a path comparing section 3, a path timing determining section 4, fingers 5, a RAKE receiver section 6, and a received data processing section 7.

Now, operations of this demodulation circuit will be described. I component signals and Q component signals that have been quadrature-detected and demodulated are respectively input to the delay profile calculating section 1. In the delay profile calculating section 1, correlation calculation is performed using known data portions of the signals to be received, and a delay profile averaged by in-phase addition and power addition is created. In the correlation peak detecting section 2, peak search is performed for the delay profile created in the delay profile calculating section 1 to select path locations with high power level for candidate path locations to be assigned to the fingers, and their path timings and correlation values are input to the path comparing section 3.

On the other hand, path timings assigned to the fingers in the previous cycle and their correlation value information have been fed back from the path timing determining section 4 to the path comparing section 3, and a threshold is determined from the correlation value information. Then, the path comparing section 3 compares the information that is input from the correlation peak detecting section 2 with the information fed back from the path timing determining section 4 to determine whether or not there is a path exceeding the threshold among the path timings that have not been assigned to the fingers. Then, it outputs the comparison result to the path timing determining section 4.

The path timing determining section 4 is provided with a guard level to prevent flapping of paths to be assigned to the fingers. Thus, the path timing determining section 4 assigns a path timing to a finger if its peak is detected at a certain path location for more than once, and excludes a path timing from assignment to a finger if its peak is not detected for more than once. This processing in the path timing determining section 4 is well known.

In the present invention, however, if the comparison result in the path comparing section 3 indicates that an intense path exceeding the threshold has appeared, the path comparing section 3 controls the guard level (i.e. the guard level is decreased or caused to be disregarded for that path timing), and the path timing determining section 4 immediately assigns the intense path to a finger. This processing by the path comparing section 3 and the path timing determining section 4 is the novel part of this invention.

Then, the fingers section 5 performs de-spreading with the timings of the paths assigned respectively to the fingers, and the RAKE receiver section 6 combines the de-spreading result of each finger. Then, from the signals combined and provided with a path diversity effect, the received data processing section 7 obtains a desired demodulation result for outputting.

On the other hand, if an intensive path exceeding the threshold does not appear, the guard level is used to prevent flapping of paths to be assigned to the fingers. In other words, the feature of the present invention is that, when a path with high intensity level that could be an intense interfering component if not RAKE-combined appeared, the path is assigned to a finger in preference to other paths. Assigning such a path with high intensity level to a finger in preference to other paths enables maintaining good receiving characteristics.

Figure 2:
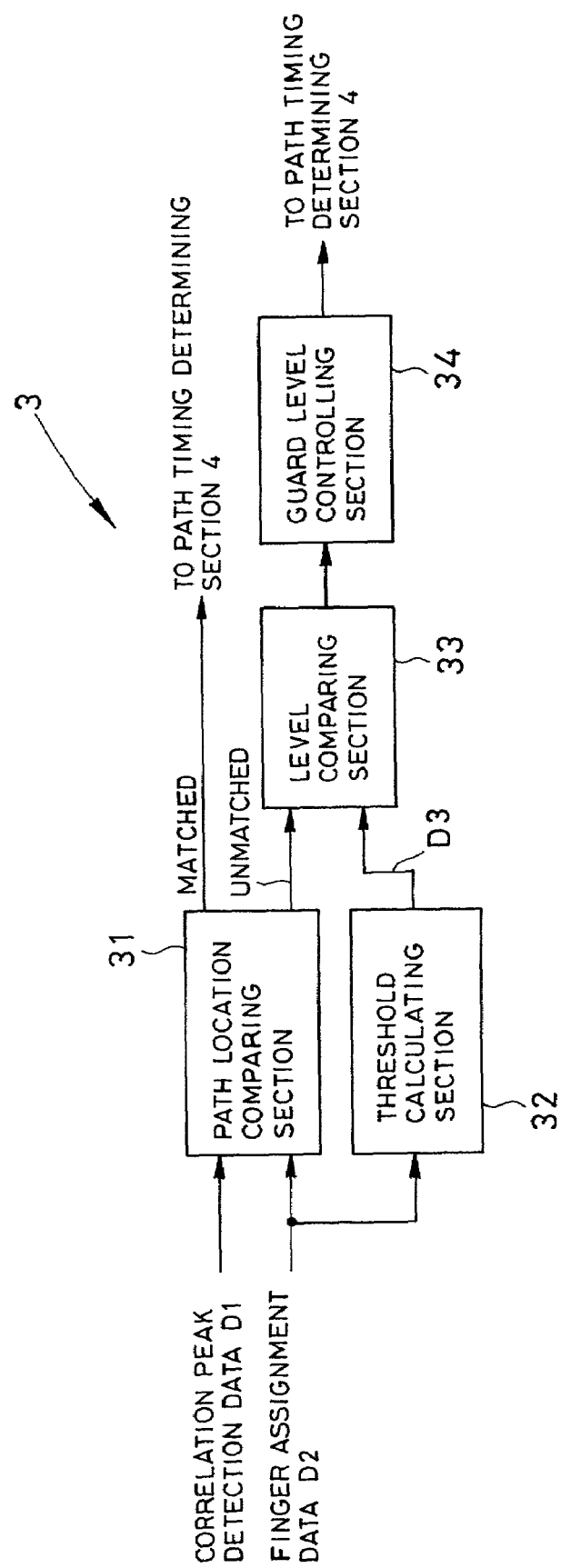
FIG. 2 is a block diagram of an example of a path comparing section 3.

Now, a configuration of the path comparing section 3 will be described. FIG. 2 is a block diagram of an example of the path comparing section 3. Referring to it, the path comparing section 3 comprises a path location comparing section 31, a threshold calculating section 32, a level comparing section 33, and a guard level controlling section 34.

Next, operations of this path comparing section 3 will be described. Correlation peak detection data D1 obtained in the correlation peak detecting section 2 as well as finger assignment data D2 of the previous cycle obtained in the path timing determining section 4 are input to the path location comparing section 31 to compare the path locations of both data D1 and D2. The threshold calculating section 32 calculates a threshold D3 based on the finger assignment data D2. The level comparing section 33 compares the outputs of the path location comparing section 31, i.e. the level of the data D1 and the threshold D3, where the path location of the data D1 is determined to be unmatched with the path location of the data D2 of the previous cycle. Then, the comparison result is input to the guard level controlling section 34. The controlling section 34 controls the guard level in the path timing determining section 4 according to the comparison result. That is, if the level of the data D1 is determined to be equal to or above the threshold D3, the guard level controlling section 34 decreases the guard level in the path timing determining section 4 or causes the guard level to be disregarded. On the other hand, if the level of the data D1 is determined to be below the threshold D3, the guard level controlling section 34 causes the guard level in the path timing determining section 4 to be executed.

Next, the method for calculating the threshold in the threshold calculating section 32 will be described. The threshold calculating section 32 first detects the maximum peak value A from the finger assignment data D2 of the previous cycle. Then, it multiplies A by B, the result of which is the threshold D3 (D3=A×B). The value for B can be one or above one (B≧1; e.g. 1.1). However, it is not to be limited to this value, but it may be a value below one (0<B<1; e.g. 0.9). In other words, different values can be set for B, depending on the purpose.

Figure 3:
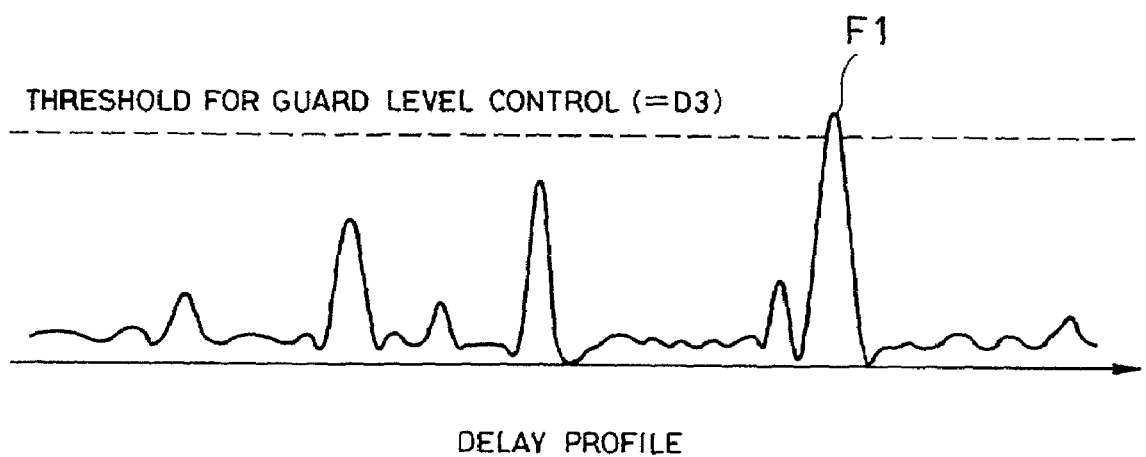
FIG. 3 is a diagram of a delay profile waveform indicating processing in a level comparing section 33.

FIG. 3 is a diagram of a delay profile waveform indicating the processing in the level comparing section 33. Referring to it, if the level comparing section 33 detects that the level of the data F1, which was determined to be unmatched with the path location of the data of the previous cycle, is equal to or above the threshold D3, the guard level controlling section 34 controls the guard level in the path timing determining section 4. Then, the path timing determining section 4 assigns the data F1 to one of the fingers 5 in preference to other data.

Figure 4:
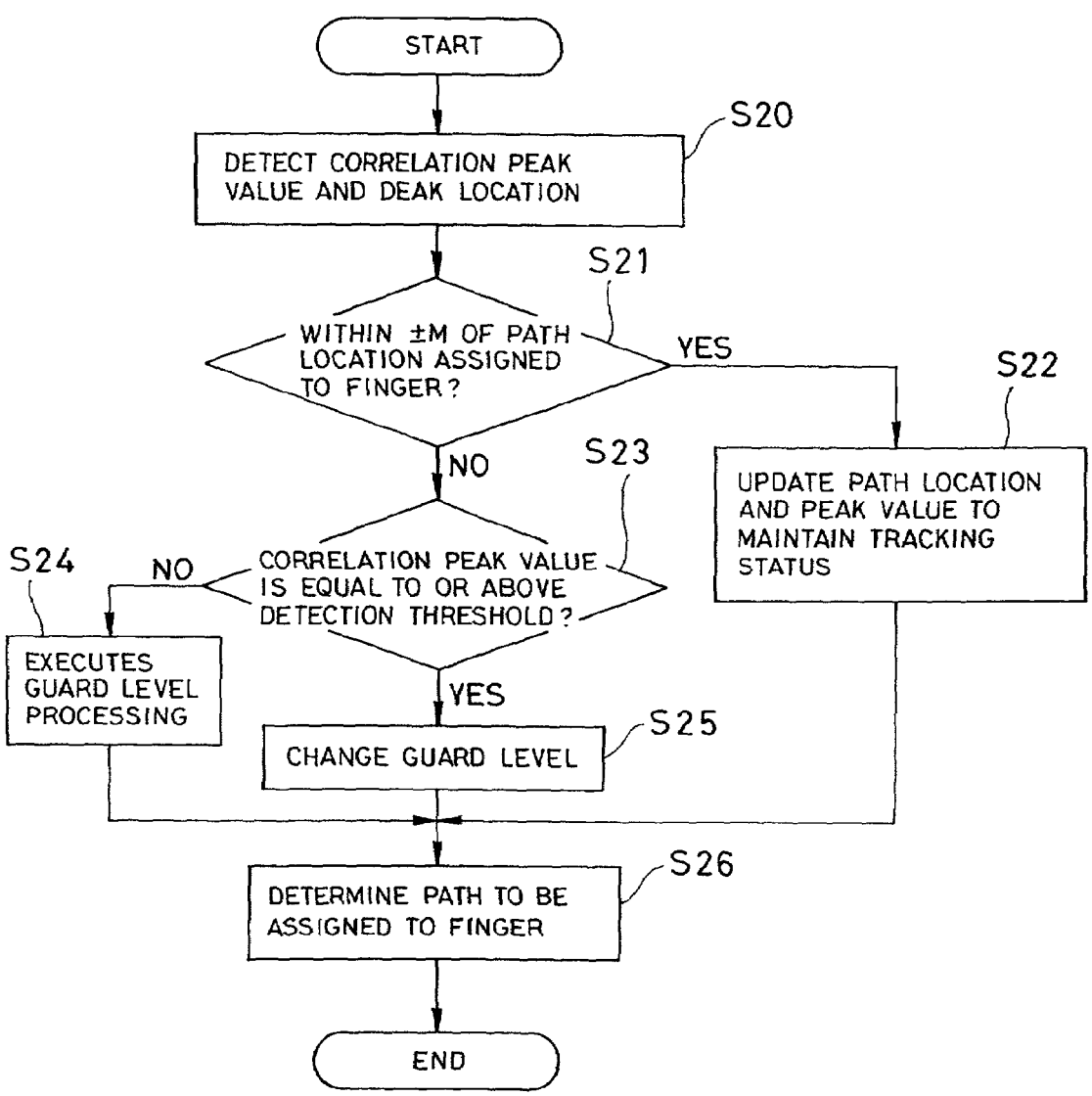
FIG. 4 is a flow chart showing operations of the path comparing section 3.

Now, the operations of the path comparing section 3 will be described in detail with reference to FIG. 1 and 4. FIG. 4 is a flow chart showing the operations of the path comparing section 3. First, the correlation peak detecting section 2 detects a correlation peak value and a peak location from the delay profile obtained in the delay profile calculating section 1 (step 20). Then, the path comparing section 3 (specifically the path location comparing section 31) determines whether or not the detected peak location has been already assigned to a finger (step 21). Here, a mask width M (M is a real number) is set so as not to cause excess switches of assignment in the finger assignment processing. If the detected timing is within M (if Yes in step 21), the path is considered as an identical path, and it is determined that tracking is performed (step 22).

The path comparing section 3 (specifically the threshold calculating section 32) also has the threshold D3 prepared for determining whether or not the path is a newly generated candidate path having high power. If the peak value is determined to be that of a different path in step 21 (if No in step 21), the peak value is compared with the threshold D3 in the path comparing section 3 (specifically in the level comparing section 33) (step 23). Then, if the peak value is equal to or above the threshold D3 (if Yes in step 23), the guard level controlling section 34 controls the guard level in the path timing determining section 4 (step 25). On the other hand, if the peak value is below the threshold D3 (if No in step 23), the guard level controlling section 34 does not control the guard level in the path timing determining section 4 (step 24).

The path timing determining section 4 uses the information (information of whether controlling the guard level or not) from the path comparing section 3 (specifically the guard level controlling section 34). If the detected peak is below the threshold D3, the path timing determining section 4 determines whether or not the path can be assigned to a finger without the guard level condition being controlled (see step 24). If the peak is equal to or above the threshold D3, it controls the guard level conditions (see step 25) to assign the path to a finger in preference to other paths with the decreased guard level that is less than the guard level of step 24. Then, the path to be assigned to a finger is determined from the results of step 22, 24, and 25 (step 26).

In this first embodiment, the maximum peak value A is detected in the finger assignment data D2 of the previous cycle to determine the threshold D3 based on the maximum peak value A. However, this embodiment is not limited by the data D2 of "the previous cycle", but it can be configured to determine the threshold D3 based on the average of maximum peak values for the past several cycles, for example.

Figure 5:
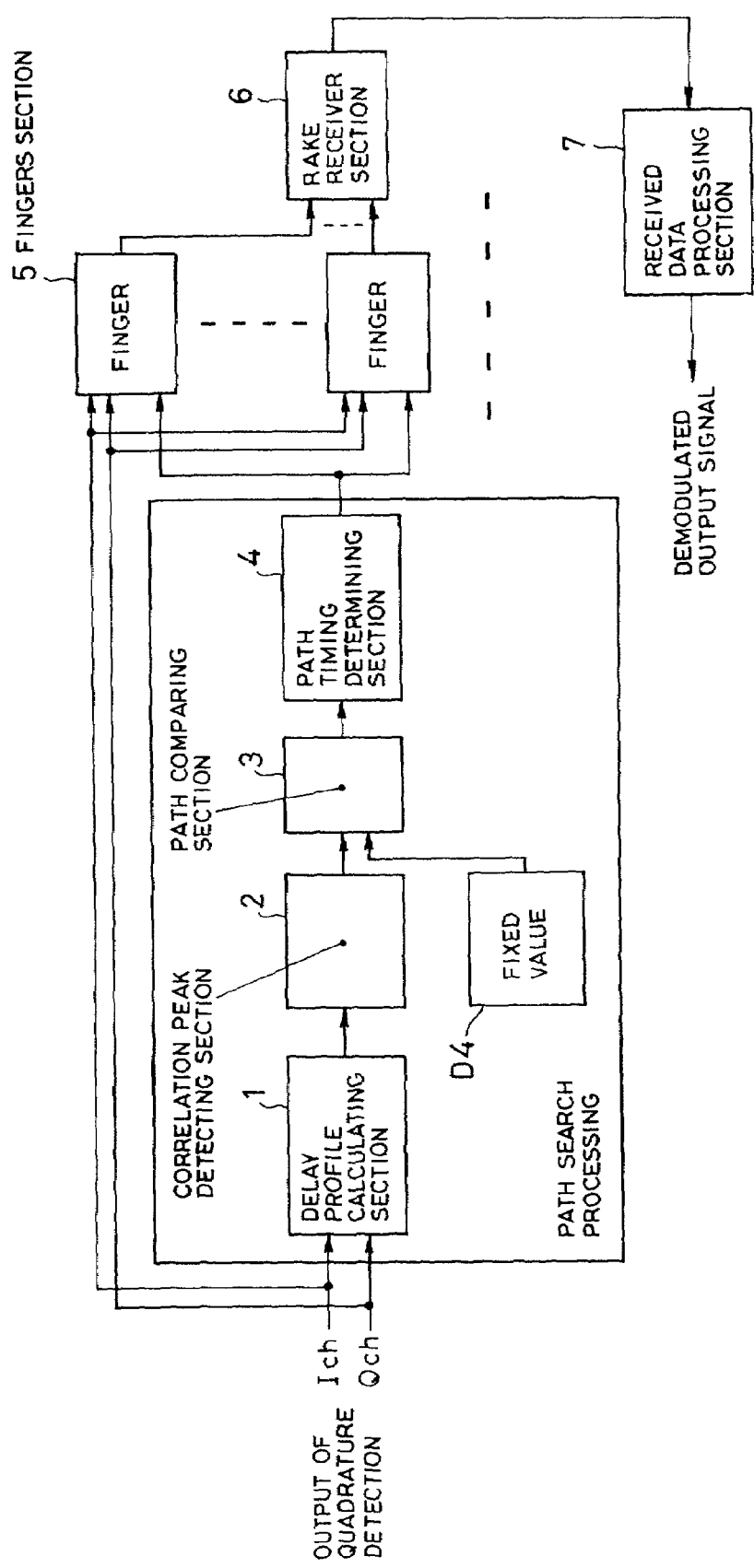
FIG. 5 is a block diagram of a second embodiment.

Next, a second embodiment will be described. FIG. 5 is a block diagram of the second embodiment. In FIG. 5, components similar to those in the configuration of the first embodiment (see FIG. 1) will be labeled with the like reference numbers, and description about them will be omitted.

Referring to FIG. 5, the second embodiment is different from the first embodiment in that the feedback line from the path timing determining section 4 to the path comparing section 3 is eliminated. In other words, it is different from the first embodiment in that the path comparing section 3 does not determine the threshold D3 based on the finger assignment data D2 of the previous cycle. In the second embodiment, the path comparing section 3 uses a fixed value D4 as the threshold.

Figure 6:
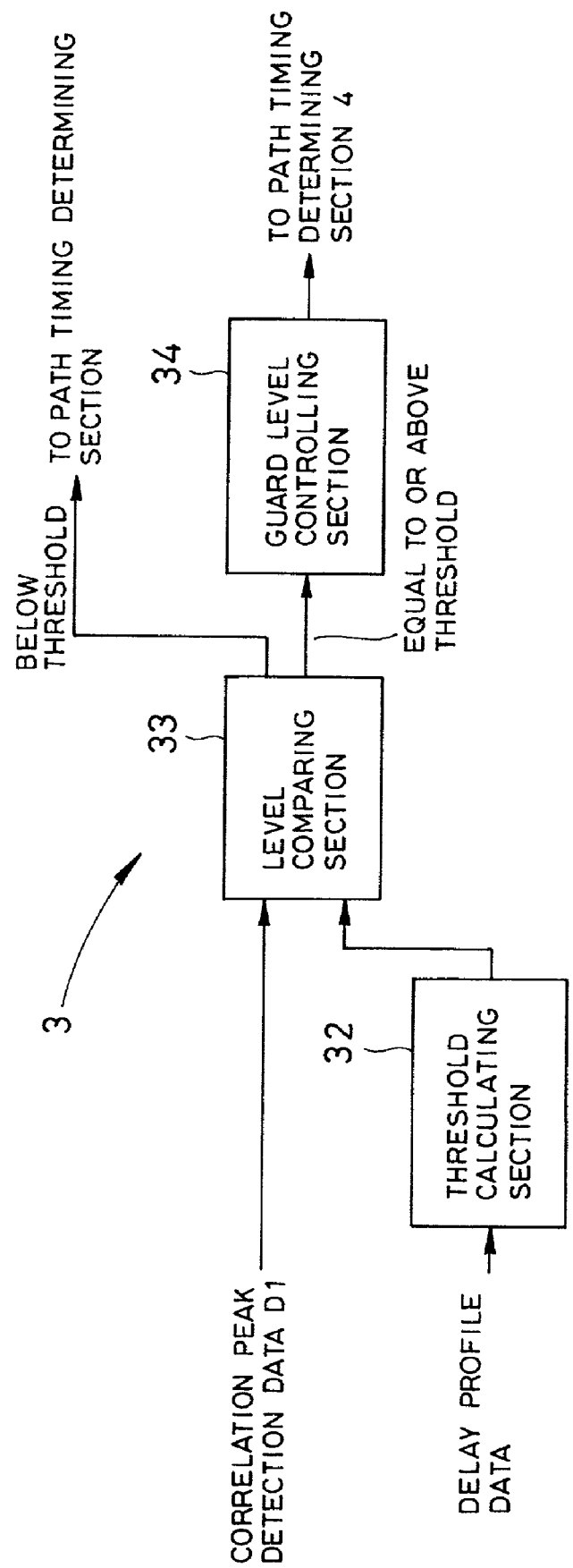
FIG. 6 is a block diagram of the path comparing section 3 in the second embodiment.

Now, a configuration of the path comparing section 3 will be described. FIG. 6 is a block diagram of the path comparing section 3 in the second embodiment. In FIG. 6, components similar to those in the configuration of the path comparing section 3 in the first embodiment (see FIG. 2) will be labeled with the like reference numbers, and description about them will be omitted. Referring to FIG. 6, the path comparing section 3 comprises the threshold calculating section 32, the level comparing section 33, and the guard level controlling section 34. That is, the path location comparing section 31 is eliminated.

Next, operations of the path comparing section 3 will be described. The threshold calculating section 32 do not specially calculate the threshold, since the above mentioned fixed value D4 is input to the threshold calculating section 32 and adopted directly as the threshold. The level comparing section 33 compares the correlation peak detection data D1 from the correlation peak detecting section 2 with the threshold D4. If the data D1 is equal to or above the threshold D4, the level comparing section 33 causes the guard level controlling section 34 to control the guard level. Accordingly, the correlation peak detection data D1 is assigned to a finger in the path timing determining section 4. On the other hand, if the data D1 is below the threshold D4, the level comparing section 33 does not cause the guard level controlling section 34 to control the guard level. Accordingly, the guard level processing is performed in the path timing determining section 4.

Figure 7:
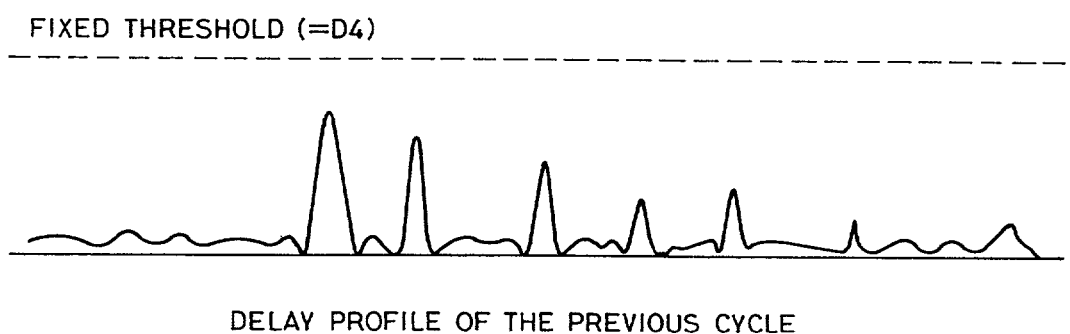
FIG. 7 is a diagram of a profile waveform indicating processing in the path comparing section 3.
Figure 8:
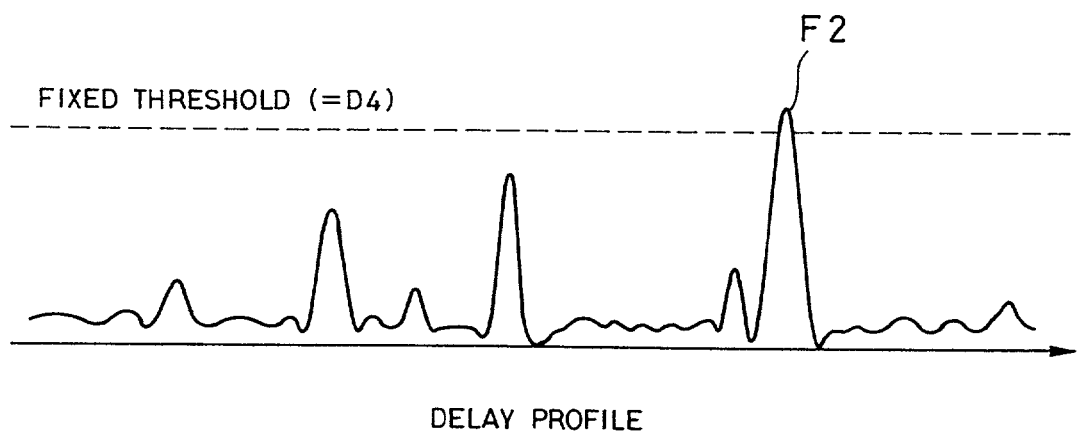
FIG. 8 is a diagram of a profile waveform indicating processing in the path comparing section 3.

FIGS. 7 and 8 are diagrams of profile waveforms indicating the processing in the path comparing section 3. They show that the threshold D4 is fixed in both cases where it is compared with the delay profile of the previous cycle and where it is compared with the current delay profile. They also show that a data having the maximum peak value F2 that is above the threshold D4 (data of a path location that is different from a path location assigned to a finger in the previous cycle) was detected by the path comparing section 3 in the current comparison. Thus, the path comparing section 3 controls the guard level so that the data having the maximum peak value F2 is assigned to one of the fingers 5 in preference to other data in the path timing determining section 4.

Figure 9:
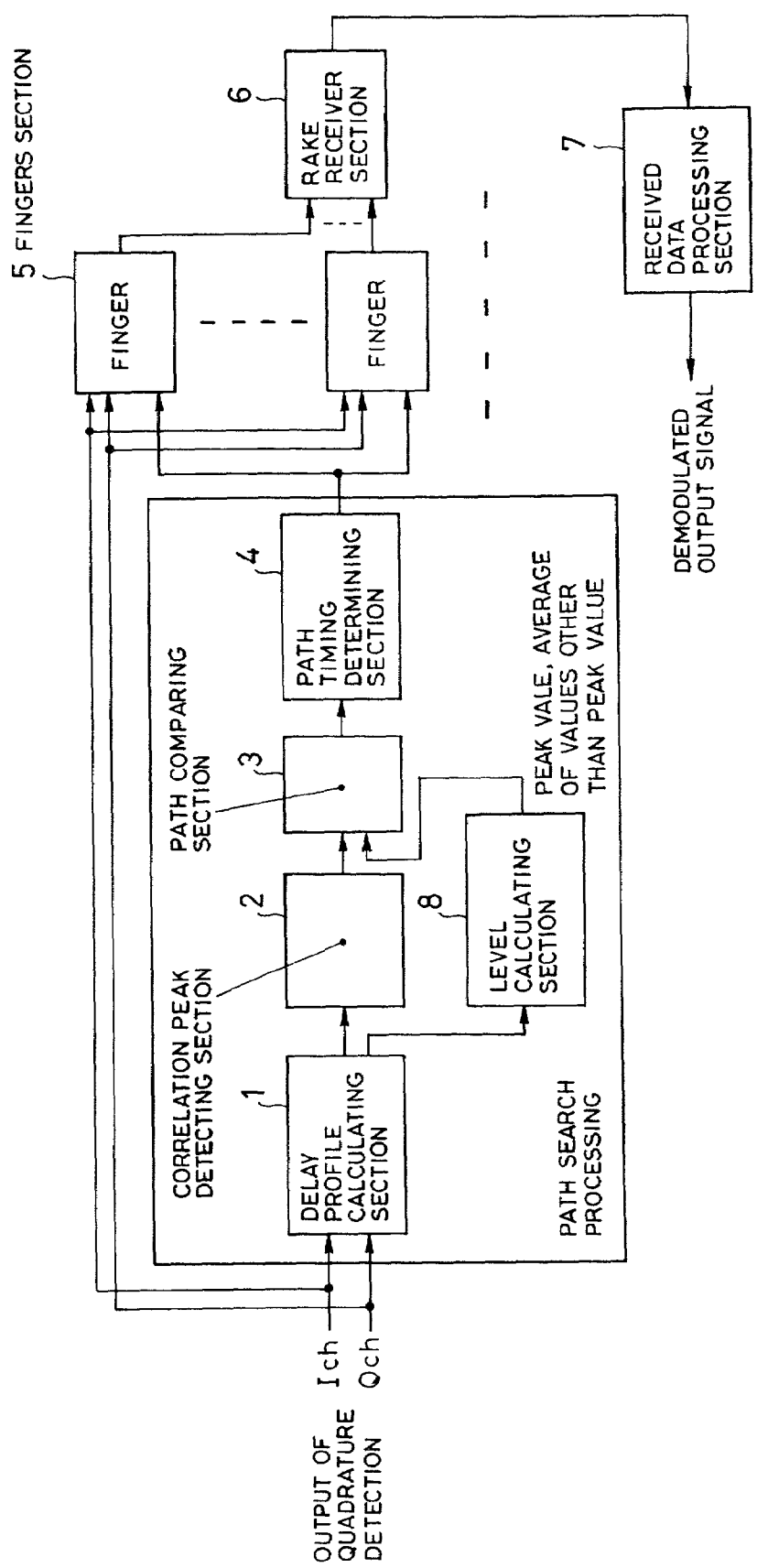
FIG. 9 is a block diagram of a third embodiment.

Now, a third embodiment will be described. FIG. 9 is a block diagram of the third embodiment. In FIG. 9, components similar to those in the configuration of the first embodiment (see FIG. 1) will be labeled with the like reference numbers, and description about them will be omitted.

Referring to FIG. 9, the third embodiment is different from the second embodiment (see FIG. 5) in that a level calculating section 8 is provided instead of the fixed value D4. Output of the delay profile calculating section 1 is input to the level calculating section 8, and output of the level calculating section 8 is input to the path comparing section 3. The level calculating section 8 detects data having the maximum peak value F3 from the delay profile of the current cycle (not of the previous cycle). Then, the threshold calculating section 32 in the path comparing section 3 calculates the threshold D5 based on the maximum peak value F3. That is, the threshold calculating section 32 multiplies the maximum peak value F3 by G ($0<G<1$), the result of which is the threshold D5 (D5=F3×G).

Figure 10:
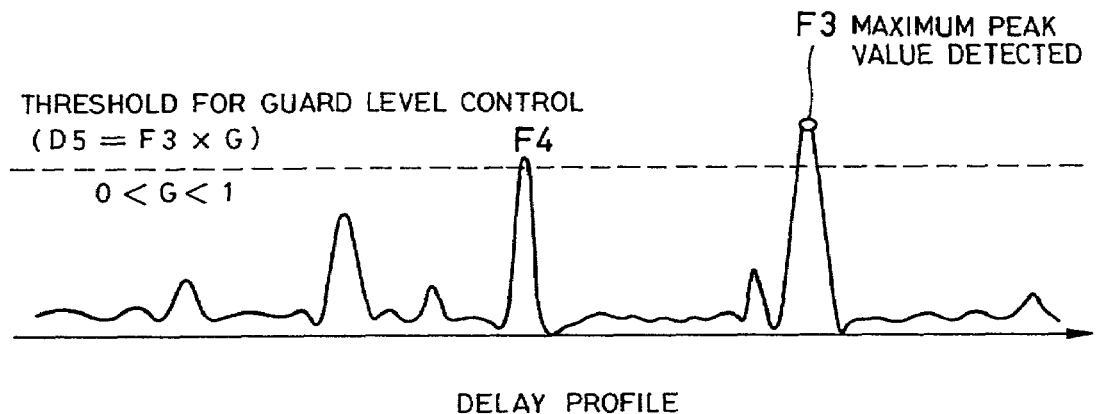
FIG. 10 is a diagram of a delay profile waveform indicating processing in the path comparing section 3.

FIG. 10 is a diagram of a delay profile waveform indicating the processing in the path comparing section 3. It shows that the maximum peak value F4 that is equal to or above the threshold D5 (data of a path location that is different from a path location assigned to a finger in the previous cycle) was detected in the current cycle. Thus, the path comparing section 3 controls the guard level so that the data having the maximum peak value F4 is assigned to one of the fingers 5 in preference to other data in the path timing determining section 4.

Now, a fourth embodiment will be described. A block diagram of the fourth embodiment is similar to the block diagram of the third embodiment (FIG. 9). The fourth embodiment is different from the third embodiment in that the level calculating section 8 calculates an average D6 of values other than the detected peak value obtained by delay profile calculation in the current cycle (i.e. an averaged interference level or noise level) and determines the threshold based on the average D6. That is, it multiplies the average D6 by H ($1 \leq H$), the result of which is the threshold D7 (D7=D6×H).

Figure 11:
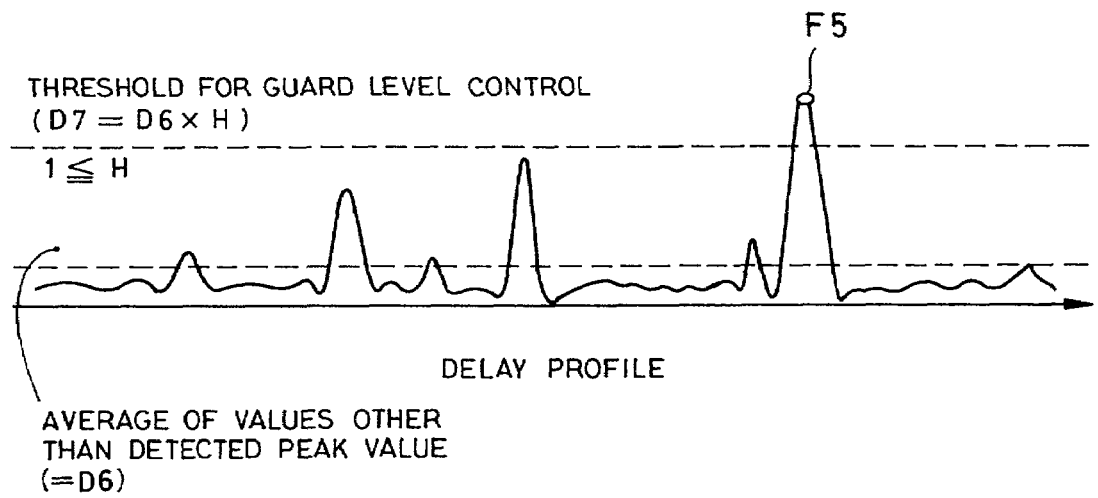
FIG. 11 is a diagram of a delay profile waveform indicating processing in the path comparing section 3.

FIG. 11 is a diagram of a delay profile waveform indicating the processing in the path comparing section 3. It shows that the maximum peak value F5 that is equal to or above the threshold D7 (data of a path location that is different from a path location assigned to a finger in the previous cycle) was detected by the path comparing section 3 in comparing the current cycle. Thus, the path comparing section 3 controls the guard level so that the data having the maximum peak value F5 is assigned to one of the fingers 5 in preference to other data in the path timing determining section 4.

Figure 12:
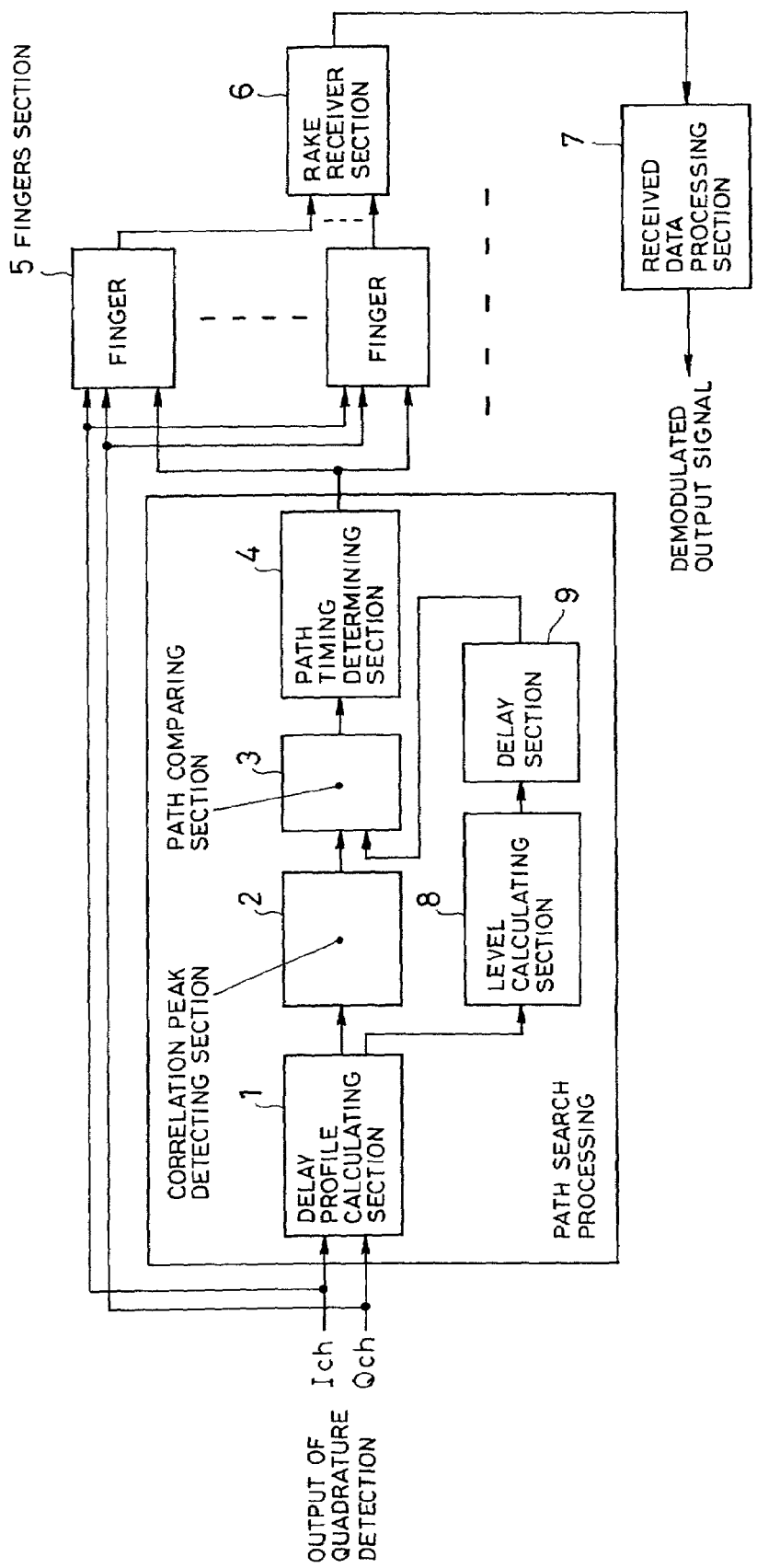
FIG. 12 is a block diagram of a fifth embodiment.

Now, a fifth embodiment will be described. FIG. 12 is a block diagram of the fifth embodiment. In FIG. 12, components similar to those in the configurations of the third and fourth embodiments (see FIG. 9) will be labeled with the like reference numbers, and description about them will be omitted. The fifth embodiment is different from the third and fourth embodiments in that a delay section 9 is added to the output side of the level calculating section 8, and that the output of the delay section 9 is input to the path comparing section 3. This means that the calculation result of the level calculating section 8 is delayed by one cycle in the delay section 9 and then input to the path comparing section 3. The path comparing section 3 compares the delay profile of the current cycle with the threshold of the previous cycle.

In the fifth embodiment, data having the maximum peak value F6 is detected from the delay profile of the previous cycle to determine the threshold based on the maximum peak value F6. That is, it multiplies the maximum peak value F6 by G ($0<G<1$), the result of which is the threshold D8 (D8=F6×G).

Figure 13:
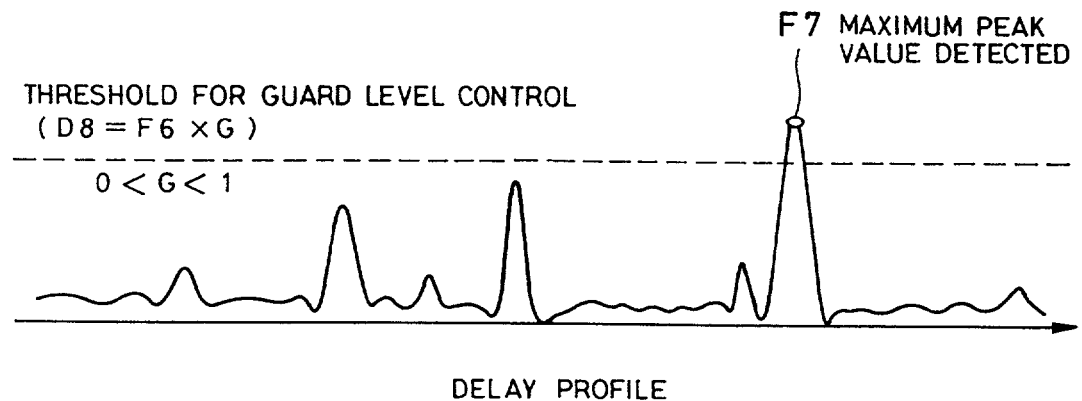
FIG. 13 is a diagram of a delay profile waveform indicating processing in the path comparing section 3.

FIG. 13 is a diagram of a delay profile waveform indicating the processing in the path comparing section 3. It shows that data having the maximum peak value F7 that is equal to or above the threshold D8 (data of a path location that is different from a path location of data of the previous cycle) was detected by the path comparing section 3 in the current cycle by comparing the delay profile of the current cycle with the threshold D8 determined based on the delay profile of the previous cycle. Thus, the path comparing section 3 controls the guard level so that the data having the maximum peak value F7 is assigned to one of the fingers 5 in preference to other data in the path timing determining section 4.

Now, a sixth embodiment will be described. The configuration of the sixth embodiment is similar to the configuration of the fifth embodiment (see FIG. 12). The sixth embodiment is different from the fifth embodiment in that it calculates an average D9 of values other than the detected peak value obtained by the delay profile calculation in the previous cycle (i.e. an averaged interference level or noise level) for the threshold and determines the threshold based on the average D9. That is, it multiplies the average D9 by H ($1 \leq H$), the result of which is the threshold D10 (D10=D9×H).

Figure 14:
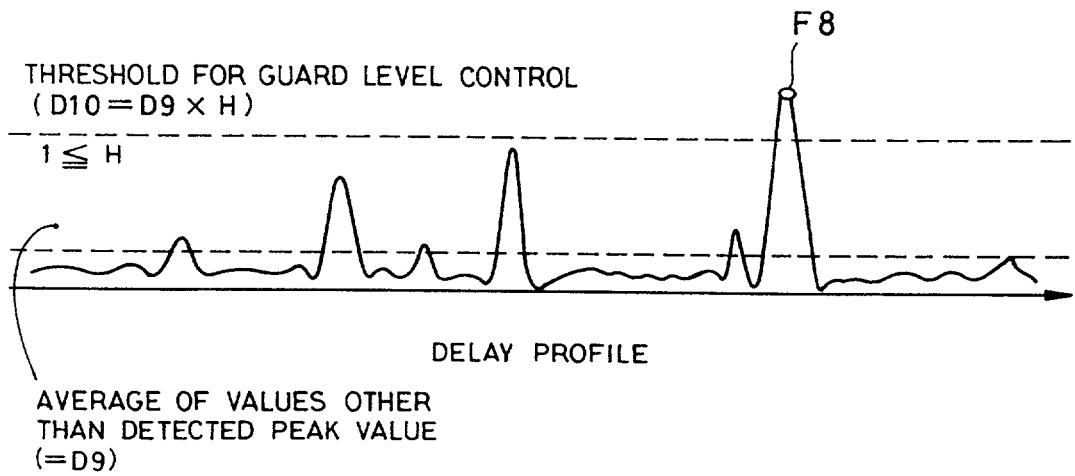
FIG. 14 is a diagram of a delay profile waveform indicating processing in the path comparing section 3.

FIG. 14 is a diagram of a delay profile waveform indicating the processing in the path comparing section 3. It shows that data having the maximum peak value F8 that is equal to or above the threshold D10 (data of a path location that is different from a path location of data of the previous cycle) was detected by the path comparing section 3 in the current cycle by comparing the delay profile of the current cycle with the threshold D10 determined based on the delay profile of the previous cycle. Thus, the path comparing section 3 controls the guard level so that the data having the maximum peak value F8 is assigned to one of the fingers 5 in preference to other data in the path timing detecting section 4.

Figure 15:
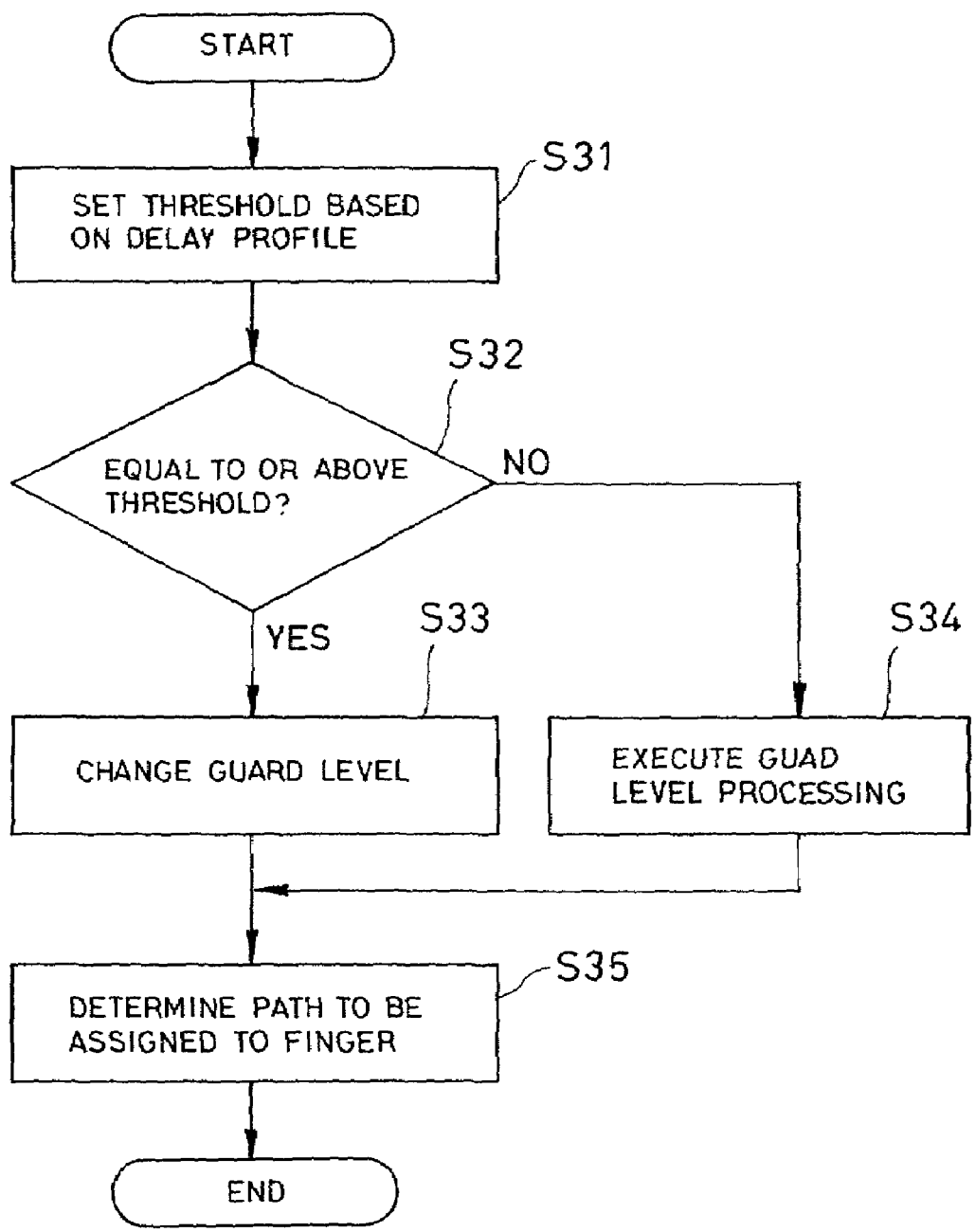
FIG. 15 is a flow chart showing operations of the second embodiment through the sixth embodiment.

FIG. 15 is a flow chart indicating the operations of the second embodiment through the sixth embodiment. Referring to it, first the threshold is set based on the delay profile determined in the delay profile calculating section 1 (step 31). Then, it is determined whether or not a correlation peak value detected in the correlation peak detecting section 2 is equal to or above the threshold (step 32). If the correlation peak value is equal to or above the threshold (if Yes in step 32), the guard level is controlled (step 33). On the other hand, if it is below the threshold (if No in step 32), the guard level is not controlled (step 34). Then, the path to be assigned to a finger is determined by the results of steps 33 and 34 (step 35).

Figure 16:
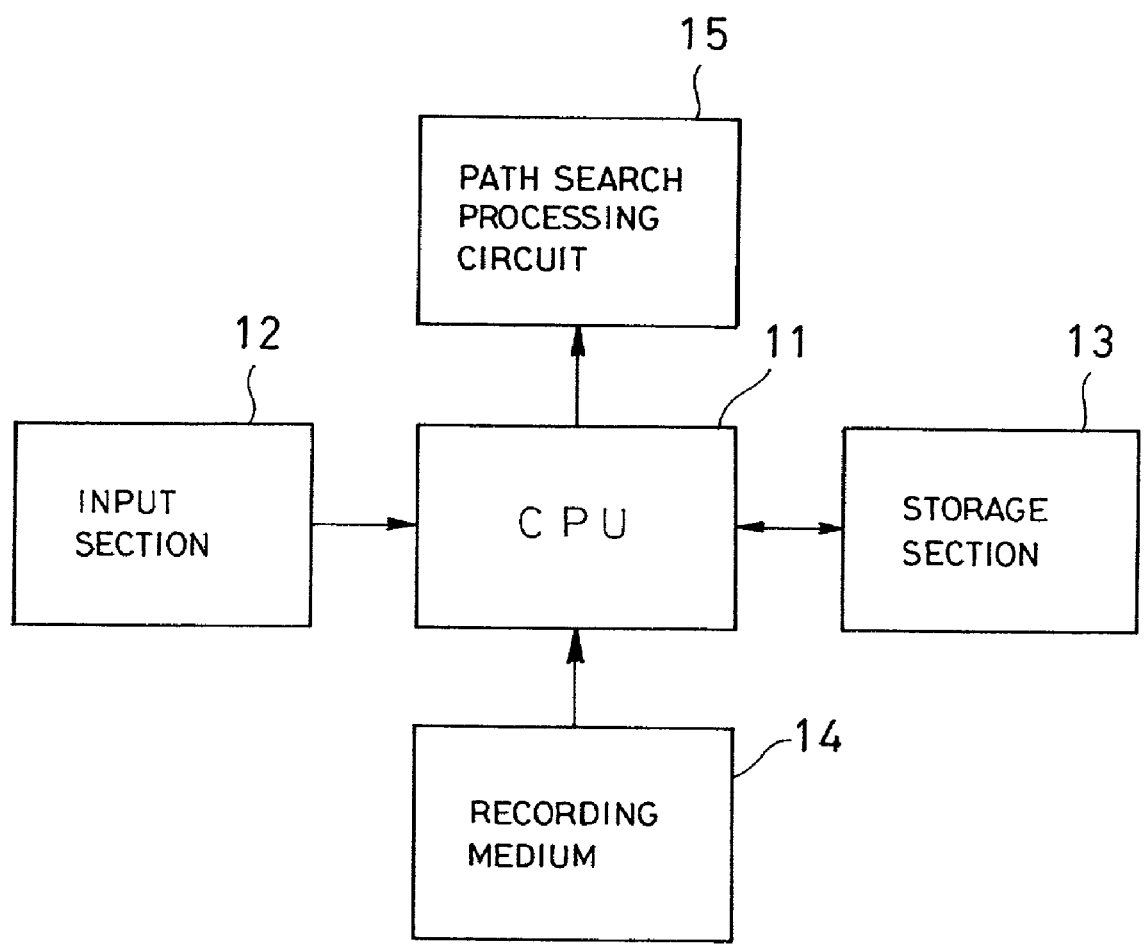
FIG. 16 is a block diagram of an example of a recording medium drive.

Now, a seventh embodiment will be described. The seventh embodiment relates to a recording medium on which a control program for the demodulation method is recorded. FIG. 16 is a block diagram of an example of a recording medium drive. Referring to it, the recording medium drive consists of a CPU (Central Processing Unit) 11, an input section 12, a storage section 13, and a path search processing circuit 15. The path search processing circuit 15 represents the above described path search processing section that consists of the delay profile calculating section 1, the correlation peak detecting section 2, the path comparing section 3, the path timing determining section 4, and so on. Recorded on the recording medium 14 is the control program represented by the above described flow charts of FIG. 4 and 15.

Next, operations of the recording medium drive will be described. When an instruction to input the program is first output from the input section 12 to the CPU 11, the CPU 11 reads the control program from the recording medium 14 and writes it into the storage section 13. After that, when an instruction to initiate the program is output from the input section 12 to the CPU 11, the CPU 11 reads the control program from the storage section 13 and controls the path search processing circuit 15 based on the control program. The details on the control will not be described, as it has been given above.

According to the first invention of the present invention, it is possible to receive a path immediately after the path appears and to provide good receiving characteristics. This is because the first invention is the demodulation apparatus for mobile communication having capability of cyclically selecting signals that meet a predetermined condition out of signals incoming via different paths, combining the signals, and outputting the combined signals, wherein the demodulation apparatus comprises threshold setting means, and signals selecting means for comparing the incoming signals with a threshold set by the threshold setting means and for selecting the compared signals according to the comparison result even if the signals do not meet the predetermined condition.

Specifically, a first advantage is the ability of quickly tracking changes in paths to be received and providing good receiving characteristics. This is provided by the fact that it is possible to respond to paths to be received immediately after they appear by assigning a new path with high power to a finger in preference to other paths if such a path is detected from the delay profile.

A second advantage is the ability of reducing the influence of erroneous detection of path timings caused by noise, and providing good receiving characteristics. This is provided by the fact that it is possible to control the guard level in an appearance of a path with a sufficiently high level of intensity using a threshold for the guard level control.

Further, according to the second invention of the present invention, the same advantages as those of the above mentioned first invention are obtained. This is because the second invention is the demodulation method for mobile communication providing capability of cyclically selecting signals that meet a predetermined condition out of signals incoming via different paths, combining the signals, and outputting the combined signals, wherein the demodulation method comprises a first step of setting a threshold, and a second step of comparing the incoming signals with the threshold set by the first step and selecting the compared signals according to the comparison result even if the signals do not meet the predetermined condition.

Further, according to the third invention of the present invention, the same advantages as those of the above mentioned first invention are obtained. This is because the third invention is the recording medium on which a control program for a demodulation method for mobile communication is recorded, the demodulation method providing capability of cyclically selecting signals that meet a predetermined condition out of signals incoming via different paths, combining the signals, and outputting the combined signals, wherein the control program is recorded on the recording medium and comprises a first step of setting a threshold, and a second step of comparing the incoming signals with the threshold set by the first step and selecting the compared signals according to the comparison result even if the signals do not meet the predetermined condition.

What is claimed is:

1. A demodulation apparatus for mobile communication having capability of cyclically selecting signals that meet a predetermined condition out of a plurality of incoming signals that travel via different paths, combining the incoming signals to obtain combined signals, and outputting the combined signals, comprising:
    path location comparing means for comparing finger assignment data obtained in a previous cycle with correlation peak detection data obtained in a current cycle, and for outputting matched path location data and unmatched path location data based on data received in the current cycle and in the previous cycle;
    threshold setting means for setting a threshold based solely on the finger assignment data obtained in the previous cycle; and
    level comparing means for comparing the unmatched path location data with the threshold set by said threshold setting means and for selecting said incoming signals according to the result of said comparison even if said incoming signals do not meet said predetermined condition,
    wherein said threshold setting means sets the threshold based on correlation value information for said incoming signals selected in the previous cycle.

2. A demodulation apparatus for mobile communication according to claim 1, wherein said threshold setting means sets the threshold as a fixed value.

3. A demodulation apparatus for mobile communication according to claim 1, further comprising:
    path timing determining means for receiving the matched path location data output by the path location comparing means; and
    guard level controlling means for receiving the comparison result of said level comparing means, and for either: a) disregarding a guard level if the correlation peak detection data in the current cycle is equal to or greater than the threshold, or b) executing the guard level in the path timing determining means if the correlation peak detection data in the current cycle is less than the threshold.

4. A demodulation apparatus for mobile communication having capability of cyclically selecting signals that meet a predetermined condition out of a plurality of incoming signals that travel via different paths, combining the incoming signals to obtain combined signals, and outputting the combined signals, comprising:
    path location comparing means for comparing finger assignment data obtained in a previous cycle with correlation peak detection data obtained in a current cycle, and for outputting matched path location data and unmatched path location data based on data received in the current cycle and in the previous cycle;
    threshold setting means for setting a threshold based solely on the finger assignment data obtained in the previous cycle; and
    level comparing means for comparing the unmatched path location data with the threshold set by said threshold setting means and for selecting said incoming signals according to the result of said comparison even if said incoming signals do not meet said predetermined condition,
    wherein said level comparing means selects signals that are signals of path locations different from path locations of said incoming signals selected in the previous cycle and that are equal to or above the threshold.

5. A demodulation apparatus for mobile communication according to claim 4, further comprising:
    path timing determining means for receiving the matched path location data output by the path location comparing means; and
    guard level controlling means for receiving the comparison result of said level comparing means, and for either: a) disregarding a guard level if the correlation peak detection data in the current cycle is equal to or greater than the threshold, or b) executing the guard level in the path timing determining means if the correlation peak detection data in the current cycle is less than the threshold.

6. A demodulation apparatus for mobile communication having capability of cyclically selecting signals that meet a predetermined condition out of a plurality of incoming signals that travel via different paths, combining the incoming signals to obtain combined signals, and outputting the combined signals, comprising:

path location comparing means for comparing finger assignment data obtained in a previous cycle with correlation peak detection data obtained in a current cycle, and for outputting matched path location data and unmatched path location data based on data received in the current cycle and in the previous cycle;

threshold setting means for setting a threshold based solely on the finger assignment data obtained in the previous cycle; and level comparing means for comparing the unmatched path location data with the threshold set by said threshold setting means and for selecting said incoming signals according to the result of said comparison even if said incoming signals do not meet said predetermined condition, wherein said threshold setting means sets the threshold based on the maximum peak value of said incoming signals selected in the previous cycle.

7. A demodulation apparatus for mobile communication according to claim 6, further comprising:

path timing determining means for receiving the matched path location data output by the path location comparing means; and guard level controlling means for receiving the comparison result of said level comparing means, and for either: a) disregarding a guard level if the correlation peak detection data in the current cycle is equal to or greater than the threshold, or b) executing the guard level in the path timing determining means if the correlation peak detection data in the current cycle is less than the threshold.

8. A demodulation apparatus having capability of cyclically selecting signals that meet a predetermined condition out of a plurality of incoming signals that travel via different paths, combining the incoming signals to obtain combined signals, and outputting the combined signals, comprising:

path location comparing means for comparing finger assignment data obtained in a previous cycle with correlation peak detection data obtained in a current cycle, and for outputting matched path location data and unmatched path location data based on data received in the current cycle and in the previous cycle;

threshold setting means for setting a threshold based solely on the finger assignment data obtained in the previous cycle; and level comparing means for comparing the unmatched path location data with the threshold set by said threshold setting means and for selecting said incoming signals according to the result of said comparison even if said incoming signals do not meet said predetermined condition, wherein said threshold setting means sets the threshold based on either: a) a maximum peak value obtained by calculation of a delay profile, or b) an average of values other than a detected peak value by calculation of the delay profile.

9. A demodulation apparatus for mobile communication according to claim 8, further comprising:

path timing determining means for receiving the matched path location data output by the path location comparing means; and guard level controlling means for receiving the comparison result of said level comparing means, and for either: a) disregarding a guard level if the correlation peak detection data in the current cycle is equal to or greater than the threshold, or b) executing the guard level in the path timing determining means if the correlation peak detection data in the current cycle is less than the threshold.

10. A demodulation method for mobile communication providing capability of cyclically selecting signals that meet a predetermined condition out of a plurality of incoming signals that travel via different paths, combining the incoming signals to obtain combined signals, and outputting the combined signals, comprising:

a first step of comparing finger assignment data obtained in a previous cycle with correlation peak detection data obtained in a current cycle, and for outputting matched path location data and unmatched path location data based on data received in the current cycle and in the previous cycle;

a second step of setting a threshold based solely on the finger assignment data obtained in the previous cycle; and a third step of comparing the unmatched path location data with the threshold set by said second step and selecting said incoming signals according to a result of said comparing even if said incoming signals do not meet said predetermined condition, wherein said second step comprises setting the threshold based on correlation value information for said incoming signals selected in the previous cycle.

11. A demodulation method for mobile communication according to claim 10, wherein said second step comprises setting the threshold as a fixed value.

12. A demodulation method according to claim 10, further comprising:

a fourth step of receiving the matched path location data output in the first step; and a fifth step of receiving the comparison result of the third step, and for either: a) disregarding a guard level in a path timing determining unit that determines a path timing if the correlation peak detection data in the current cycle is equal to or greater than the threshold, or b) executing the guard level in the path timing determining unit if the correlation peak detection data in the current cycle is less than the threshold.

13. A demodulation method for mobile communication providing capability of cyclically selecting signals that meet a predetermined condition out of a plurality of incoming signals that travel via different paths, combining the incoming signals to obtain combined signals, and outputting the combined signals, comprising:

a first step of comparing finger assignment data obtained in a previous cycle with correlation peak detection data obtained in a current cycle, and for outputting matched path location data and unmatched path location data based on data received in the current cycle and in the previous cycle;

a second step of setting a threshold based solely on the finger assignment data obtained in the previous cycle; and a third step of comparing the unmatched path location data with the threshold set by said second step and selecting said incoming signals according to a result of said comparing even if said incoming signals do not meet said predetermined condition, wherein said third step comprises selecting signals that are signals of path locations different from path locations of said incoming signals selected in the previous cycle and that are equal to or above the threshold.

14. A demodulation method according to claim 13, further comprising:
- a fourth step of receiving the matched path location data output in the first step; and
- a fifth step of receiving the comparison result of the third step, and for either: a) disregarding a guard level in a path timing determining unit that determines a path timing if the correlation peak detection data in the current cycle is equal to or greater than the threshold, or b) executing the guard level in the path timing determining unit if the peak detection data in the correlation current cycle is less than the threshold.

15. A demodulation method for mobile communication providing capability of cyclically selecting signals that meet a predetermined condition out of a plurality of incoming signals that travel via different paths, combining the incoming signals to obtain combined signals, and outputting the combined signals, comprising:
- a first step of comparing finger assignment data obtained in a previous cycle with correlation peak detection data obtained in a current cycle, and for outputting matched path location data and unmatched path location data based on data received in the current cycle and in the previous cycle;
- a second step of setting a threshold based solely on the finger assignment data obtained in the previous cycle; and
- a third step of comparing the unmatched path location data with the threshold set by said second step and selecting said incoming signals according to a result of said comparing even if said incoming signals do not meet said predetermined condition,
wherein said second step comprises setting the threshold based on the maximum peak value of the signals selected in the previous cycle.

16. A demodulation method according to claim 15, further comprising:
- a fourth step of receiving the matched path location data output in the first step; and
- a fifth step of receiving the comparison result of the third step, and for either: a) disregarding a guard level in a path timing determining unit that determines a path timing if the correlation peak detection data in the current cycle is equal to or greater than the threshold, or b) executing the guard level in the path timing determining unit if the peak detection data in the correlation current cycle is less than the threshold.

17. A demodulation method for mobile communication providing capability of cyclically selecting signals that meet a predetermined condition out of a plurality of incoming signals that travel via different paths, combining the incoming signals to obtain combined signals, and outputting the combined signals, comprising:
- a first step of comparing finger assignment data obtained in a previous cycle with correlation peak detection data obtained in a current cycle, and for outputting matched path location data and unmatched path location data based on data received in the current cycle and in the previous cycle;
- a second step of setting a threshold based solely on the finger assignment data obtained in the previous cycle; and
- a third step of comparing the unmatched path location data with the threshold set by said second step and selecting said incoming signals according to a result of said comparing even if said incoming signals do not meet said predetermined condition,
wherein said second step comprises setting the threshold based on either: a) a maximum peak value obtained by calculation of a delay profile, or b) an average of values other than a detected peak value by calculation of the delay profile.

18. A demodulation method according to claim 17, further comprising:
- a fourth step of receiving the matched path location data output in the first step; and
- a fifth step of receiving the comparison result of the third step, and for either: a) disregarding a guard level in a path timing determining unit that determines a path timing if the correlation peak detection data in the current cycle is equal to or greater than the threshold, or b) executing the guard level in the path timing determining unit if the correlation peak detection data in the current cycle is less than the threshold.

19. A recording medium on which a control program for a demodulation method for mobile communication is recorded, the demodulation method providing capability of cyclically selecting signals that meet a predetermined condition out of a plurality of incoming signals that travel via different paths, combining the incoming signals to obtain combined signals, and outputting the combined signals, wherein
the control program is recorded on the recording medium and comprises a first step of comparing finger assignment data obtained in a previous cycle with correlation peak detection data obtained in a current cycle, and for outputting matched path location data and unmatched path location data based on data received in the current cycle and in the previous cycle, and a second step of setting a threshold based solely on the finger assignment data obtained in the previous cycle, and a third step of comparing the unmatched path location data with the threshold set by said second step and selecting said incoming signals according to a result of said comparison even if said incoming signals do not meet said predetermined condition,
wherein said second step comprises setting the threshold based on correlation value information for said incoming signals selected in the previous cycle.

20. A recording medium on which a control program for a demodulation method for mobile communication is recorded, the demodulation method providing capability of cyclically selecting signals that meet a predetermined condition out of a plurality of incoming signals that travel via different paths, combining the incoming signals to obtain combined signals, and outputting the combined signals, wherein
the control program is recorded on the recording medium and comprises a first step of comparing finger assignment data obtained in a previous cycle with correlation peak detection data obtained in a current cycle, and for outputting matched path location data and unmatched path location data based on data received in the current cycle and in the previous cycle, and a second step of setting a threshold based solely on the finger assignment data obtained in the previous cycle, and a third step of comparing the unmatched path location data with the threshold set by said second step and selecting said incoming signals according to a result of said comparison even if said incoming signals do not meet said predetermined condition,
wherein said third step comprises selecting signals that are signals of path locations different from path locations of said incoming signals selected in the previous cycle and that are equal to or above the threshold.

21. A recording medium according to claim 20, wherein said second step comprises setting the threshold as a fixed value.

22. A recording medium on which a control program for a demodulation method for mobile communication is recorded, the demodulation method providing capability of cyclically selecting signals that meet a predetermined condition out of a plurality of incoming signals that travel via different paths, combining the incoming signals to obtain combined signals, and outputting the combined signals, wherein the control program is recorded on the recording medium and comprises a first step of comparing finger assignment data obtained in a previous cycle with correlation peak detection data obtained in a current cycle, and for outputting matched path location data and unmatched path location data based on data received in the current cycle and in the previous cycle, and a second step of setting a threshold based solely on the finger assignment data obtained in the previous cycle, and a third step of comparing the unmatched path location data with the threshold set by said second step and selecting said incoming signals according to a result of said comparison even if said incoming signals do not meet said predetermined condition, wherein said second step comprises setting the threshold based on the maximum peak value of said incoming signals selected in the previous cycle.

23. A recording medium on which a control program for a demodulation method for mobile communication is recorded, the demodulation method providing capability of cyclically selecting signals that meet a predetermined condition out of a plurality of incoming signals that travel via different paths, combining the incoming signals to obtain combined signals, and outputting the combined signals, wherein the control program is recorded on the recording medium and comprises a first step of comparing finger assignment data obtained in a previous cycle with correlation peak detection data obtained in a current cycle, and for outputting matched path location data and unmatched path location data based on data received in the current cycle and in the previous cycle, and a second step of setting a threshold based solely on the finger assignment data obtained in the previous cycle, and a third step of comparing the unmatched path location data with the threshold set by said second step and selecting said incoming signals according to a result of said comparison even if said incoming signals do not meet said predetermined condition, wherein said second step comprises either: a) setting the threshold based on a maximum peak value obtained by calculation of a delay profile, or b) setting the threshold based on an average of values other than a detected peak value by calculation of the delay profile.

24. A demodulation apparatus for mobile communication having capability of cyclically selecting signals that meet a predetermined condition out of a plurality of incoming signals that travel via different paths, combining the incoming signals to obtain combined signals, and outputting the combined signals, comprising:

path location comparing means for comparing finger assignment data obtained in a previous cycle with correlation peak detection data obtained in a current cycle, and for outputting matched path location data and unmatched path location data based on data received in the current cycle and in the previous cycle;

threshold setting means for setting a threshold based solely on the finger assignment data obtained in the previous cycle; and level comparing means for comparing the unmatched path location data with the threshold set by said threshold setting means and for selecting said incoming signals according to the result of said comparison even if said incoming signals do not meet said predetermined condition, wherein said predetermined condition is to detect the peak of said incoming signals at a certain path location for more than once.

25. A demodulation apparatus for mobile communication having capability of cyclically selecting signals that meet a predetermined condition out of a plurality of incoming signals that travel via different paths, combining the incoming signals to obtain combined signals, and outputting the combined signals, comprising:

path location comparing means for comparing finger assignment data obtained in a previous cycle with correlation peak detection data obtained in a current cycle, and for outputting matched path location data and unmatched path location data based on data received in the current cycle and in the previous cycle;

threshold setting means for setting a threshold based solely on the finger assignment data obtained in the previous cycle; and level comparing means for comparing the unmatched path location data with the threshold set by said threshold setting means and for selecting said incoming signals according to the result of said comparison even if said incoming signals do not meet said predetermined condition, wherein said level comparing means selects said incoming signals if the respective levels of said incoming signals are equal to or above said threshold.

26. A demodulation method for mobile communication providing capability of cyclically selecting signals that meet a predetermined condition out of a plurality of incoming signals that travel via different paths, combining the incoming signals to obtain combined signals, and outputting the combined signals, comprising:

a first step of comparing finger assignment data obtained in a previous cycle with correlation peak detection data obtained in a current cycle, and for outputting matched path location data and unmatched path location data based on data received in the current cycle and in the previous cycle;

a second step of setting a threshold based solely on the finger assignment data obtained in the previous cycle; and a third step of comparing the unmatched path location data with the threshold set by said second step and selecting said incoming signals according to a result of said comparing even if said incoming signals do not meet said predetermined condition, wherein said predetermined condition is to detect the peak of said incoming signals at a certain path location for more than once.

27. A demodulation method for mobile communication providing capability of cyclically selecting signals that meet a predetermined condition out of a plurality of incoming signals that travel via different paths, combining the incoming signals to obtain combined signals, and outputting the combined signals, comprising:

a first step of comparing finger assignment data obtained in a previous cycle with correlation peak detection data obtained in a current cycle, and for outputting matched path location data and unmatched path location data based on data received in the current cycle and in the previous cycle;

a second step of setting a threshold based solely on the finger assignment data obtained in the previous cycle; and a third step of comparing the unmatched path location data with the threshold set by said second step and selecting said incoming signals according to a result of said comparing even if said incoming signals do not meet said predetermined condition, wherein said third step selects said incoming signals if the respective levels of said incoming signals are equal to or above said threshold.

28. A recording medium on which a control program for a demodulation method for mobile communication is recorded, the demodulation method providing capability of cyclically selecting signals that meet a predetermined condition out of a plurality of incoming signals that travel via different paths, combining the incoming signals to obtain combined signals, and outputting the combined signals, wherein the control program is recorded on the recording medium and comprises a first step of comparing finger assignment data obtained in a previous cycle with correlation peak detection data obtained in a current cycle, and for outputting matched path location data and unmatched path location data based on data received in the current cycle and in the previous cycle, and a second step of setting a threshold based solely on the finger assignment data obtained in the previous cycle, and a third step of comparing the unmatched path location data with the threshold set by said second step and selecting said incoming signals according to a result of said comparison even if said incoming signals do not meet said predetermined condition, wherein said predetermined condition is to detect the peak of said incoming signals at a certain path location for more than once.

29. A recording medium on which a control program for a demodulation method for mobile communication is recorded, the demodulation method providing capability of cyclically selecting signals that meet a predetermined condition out of a plurality of incoming signals that travel via different paths, combining the incoming signals to obtain combined signals, and outputting the combined signals, wherein the control program is recorded on the recording medium and comprises a first step of comparing finger assignment data obtained in a previous cycle with correlation peak detection data obtained in a current cycle, and for outputting matched path location data and unmatched path location data based on data received in the current cycle and in the previous cycle, and a second step of setting a threshold based solely on the finger assignment data obtained in the previous cycle, and a third step of comparing the unmatched path location data with the threshold set by said second step and selecting said incoming signals according to a result of said comparison even if said incoming signals do not meet said predetermined condition, wherein said second step selects said incoming signals if the respective levels of said incoming signals are equal to or above said threshold.

* * * * *